United States Patent
Musatenko et al.

(10) Patent No.: US 9,860,456 B1
(45) Date of Patent: Jan. 2, 2018

(54) BAYER-CLEAR IMAGE FUSION FOR DUAL CAMERA

(71) Applicant: Motorola Mobility LLC, Chicago, IL (US)

(72) Inventors: Yuriy Musatenko, Mountain View, CA (US); Kostyantyn Milshteyn, Cupertino, CA (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 15/349,948

(22) Filed: Nov. 11, 2016

(51) Int. Cl.
*H04N 5/262* (2006.01)
*H04N 5/225* (2006.01)
*H04N 5/265* (2006.01)
*H04N 9/64* (2006.01)

(52) U.S. Cl.
CPC ......... *H04N 5/2621* (2013.01); *H04N 5/2258* (2013.01); *H04N 5/265* (2013.01); *H04N 9/646* (2013.01)

(58) Field of Classification Search
None
See application file for complete search history.

(56) References Cited

U.S. PATENT DOCUMENTS

| | | | | |
|---|---|---|---|---|
| 9,207,759 | B1* | 12/2015 | El Dokor | G06T 3/4015 |
| 2013/0335598 | A1* | 12/2013 | Gustavsson | H04N 5/2351 348/234 |
| 2013/0335600 | A1* | 12/2013 | Gustavsson | H04N 5/2621 348/239 |
| 2014/0267351 | A1* | 9/2014 | Klaus | G09G 5/02 345/589 |
| 2016/0050354 | A1* | 2/2016 | Musatenko | H04N 5/2355 348/229.1 |
| 2016/0080626 | A1* | 3/2016 | Kovtun | H04N 5/2355 348/218.1 |
| 2017/0094164 | A1* | 3/2017 | Shabtay | H04N 5/23232 |
| 2017/0109867 | A1* | 4/2017 | Milshteyn | G06T 5/002 |
| 2017/0126959 | A1* | 5/2017 | Shabtay | H04N 5/23212 |

* cited by examiner

*Primary Examiner* — Shahbaz Nazrul

(57) ABSTRACT

The embodiments described herein perform image infusion on Bayer image data that is coordinated with Clear image data captured with a dual camera. A first image sensor of the dual camera captures a Bayer image, while a second sensor captures a Clear image, where the first sensor and the second sensor are synchronized to capture the images at the same time. Some embodiments generate a relational mapping of Clear luma channel data extracted from the Clear image to Bayer luma channel data extracted from the Bayer image data, and use the relational mapping to generate multiple de-noised luma representations associated with the Bayer image. The multiple de-noised luma representations are then selectively merged together to generate a resultant image that retains a high signal-to-noise radio (SNR) and reduces artifacts obtained by the image processing.

20 Claims, 9 Drawing Sheets

BAYER-CLEAR IMAGE FUSION FOR DUAL CAMERA

BACKGROUND

Many devices today incorporate a camera. This allows users to capture and store moments with ease. More and more, users desire the ability to transport their devices from place to place, thus adding a drive to reduce a corresponding size of a device. As a device decreases in size so, too, does the integrated camera. However, this can cause a tradeoff in picture quality, in that smaller cameras may include components with less capabilities and/or capacity, thus impacting their ability to generate high quality images.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
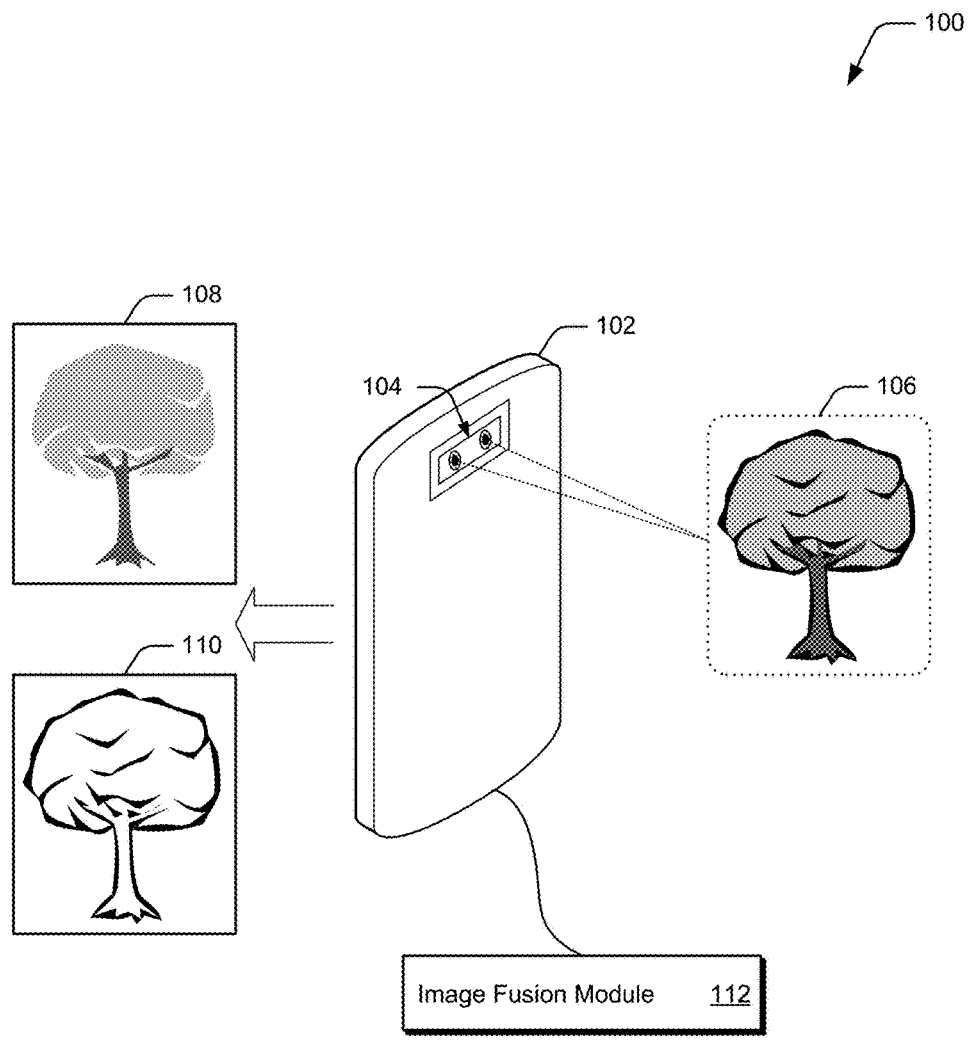
FIG. 1 is an overview of a representative environment that includes an example implementation in accordance with one or more embodiments.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

To provide a higher quality image than images captured by a single lens camera, some cameras incorporate multiple lenses or image sensors. While multiple image sensors can be used to produce an improved image relative to an image captured with a single image sensor, multiple image sensors can still pose challenges. For example, when physically placed in a device, the different sensors inherently have different perspectives of a scene since they are physically located at different positions on the device. Unsynchronized images that are captured at different times also introduce additional error into an image since various aspects of the scene may have altered between the images. Shading of image sensors can additionally obscure the light that is used to capture images, and can also cause distortion. Thus, it can be challenging to incorporate information from multiple sources in order to generate a captured image with low distortion.

The embodiments described herein perform image infusion on Bayer image data that is coordinated with Clear image data captured with a dual camera. A first image sensor of the dual camera captures a Bayer image, while a second sensor captures a Clear image. The first sensor and the second sensor are synchronized to capture the images at the same time. Some embodiments generate a relational mapping of Clear luma channel data extracted from the Clear image to Bayer luma channel data extracted from the Bayer image data, and use the relational mapping to generate multiple luma representations associated with the Bayer image and its structure, where the luma representations can sometimes, and optionally, be de-noised luma representations. The multiple de-noised luma representations are then selectively merged together to generate a resultant image that retains a high signal-to-noise radio (SNR) and reduces artifacts obtained by the image processing.

Consider now an example environment in which the inventive principles can be employed.

Example Environment

FIG. 1 illustrates an example operating environment 100 in accordance with one or more embodiments. Environment 100 includes computing device 102 in the form of a mobile phone. However, it is to be appreciated that computing device 102 can be any other suitable type of computing device without departing from the scope of the claimed subject matter. Computing device 102 includes image sensors 104, which work together in concert to generate a digital image. For example, image sensors 104 include two image sensors that capture respective images. In some cases, each respective image sensor is designed to capture different information, such as color image information, clear or shading image information, raw image data, and so forth. Images can be stored in various color spaces and representations, such as Red-Green-Blue (RGB), standard Red-Green-Blue (sRGB), Luminance-Blue-Luminance-Red-Luminance (YUV), a color-opponent space with Lightness and color-opponent dimensions (CIE L*a*b), and so forth. These images can also be stored or expressed in any suitable format, such as Joint Photographic Experts Group (JPEG), (Tagged Image File Format) TIFF, Graphics Interchange Format (GIF), bitmap (BMP), Portable Network Graphics (PNG), High-Dynamic-Range Imaging (HDRI), and so forth. These sensors can have various resolutions and be of any suitable types, examples of which are provided below.

Environment 100 includes a scene 106 that generally represents any suitable viewpoint or object that a camera can visually capture. In this example, each respective image sensor of image sensors 104 captures a respective image that relates to scene 106 such that a first image sensor captures digital image 108 and a second image sensor captures digital image 110. Thus, while each of these images relates to scene 106, they capture different information. In some embodiments, digital image 108 represents a color image of scene 106, and digital image 110 represents a clear representation of scene 106, as further described below. Here, the term "image sensor" generally represents a sensor that is used to capture a corresponding image, and can be a single sensor, or multiple smaller sensors that work together to generate a single image.

Computing device 102 includes image fusion module 112. Among other things, image fusion module 112 represents functionality that generates a digital image by fusing together information from different captured information. In some embodiments, image fusion module 112 receives digital image 108 and digital image 110 as inputs, and uses information from each to generate an improved image. Each set of respective information is processed and/or filtered, and then fused together to generate a fused digital image of scene 106. For example, some embodiments extract a Bayer luma image (alternately referred to as luma channel data) from digital image 108 and generate a mapping that identifies a relationship between the Bayer luma image and clear image information generated by digital image 110. After aligning the images through the mapping, image fusion module 112 performs processing on these images, such as subtracting a realigned Clear image information from the Bayer luma information to identify differences between the two. Image fusion module 112 can also filter the difference to reduce noise, and add the de-noised difference image back together with the realigned Clear image. In some embodiments, image fusion module also identifies artifacts in the resultant image to selectively merge or fuse information back together to generate a digital image, as further described in more detail below.

Figure 2:
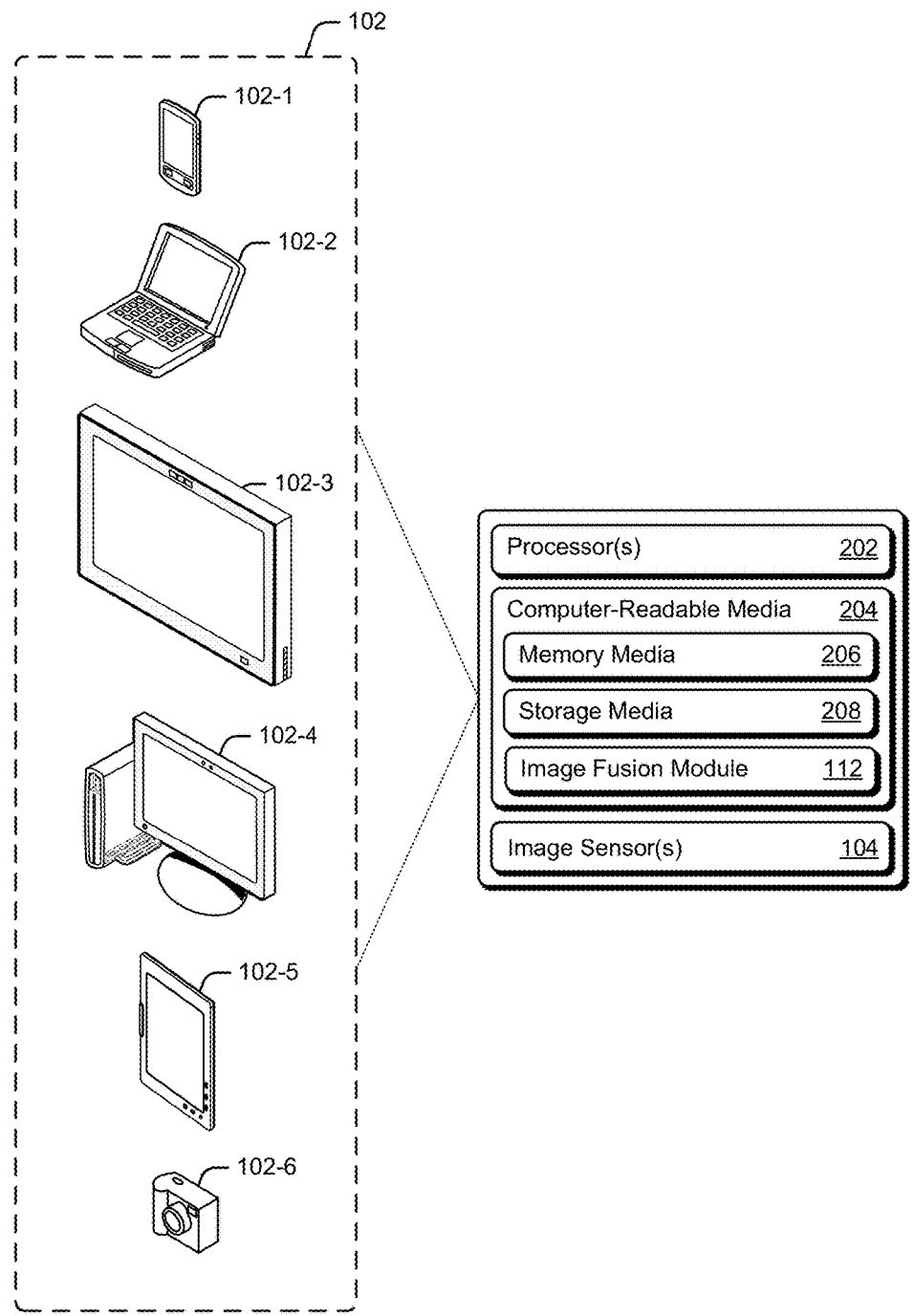
FIG. 2 illustrates a more detailed view of an example implementation included in FIG. 1.

FIG. 2 illustrates an expanded view of computing device 102 of FIG. 1 with various non-limiting example devices including: smartphone 102-1, laptop 102-2, television 102-3, desktop 102-4, tablet 102-5, and camera 102-6. Accordingly, computing device 102 is representative of any suitable device with digital image capture and processing capabilities. Computing device 102 includes processor(s) 202 and computer-readable media 204, which includes memory media 206 and storage media 208. Applications and/or an operating system (not shown) embodied as computer-readable instructions on computer-readable media 204 can be executed by processor(s) 202 to provide some or all of the functionalities described herein. Computer-readable media 204 also includes image fusion module 112. While image fusion module 112 is illustrated here as residing on computer-readable media 204, it can alternately or additionally be implemented using hardware, firmware, or any combination thereof. As noted above, computing device 102 includes image sensors 104, which can be one or multiple image capture mechanisms. In some embodiments, the image sensors of a dual camera each have similar fields of view that can be used to provide relatively large image overlap (e.g. >90%). In other cases, the overlap between the image sensors may be smaller, but embodiments described herein can be used to improve an image in the area in which the captured images overlap, large or small.

Having described an example operating environment in which various embodiments can be utilized, consider now a discussion of Bayer-Clear image fusion, in accordance with one or more embodiments.

Bayer-Clear Image Fusion

Image sensors capture and preserve an image based upon light detected by the image sensors. An analog camera exposes a filmstrip as a way to detect or capture light. Light alters the filmstrip and, in turn, the image can be recovered by chemically processing the filmstrip. In an analog image capture, the light is continuously exposed to the filmstrip, and the filmstrip stores a continuous representation of the light. Conversely, a digital camera stores discrete representations of the image.

Figure 3:
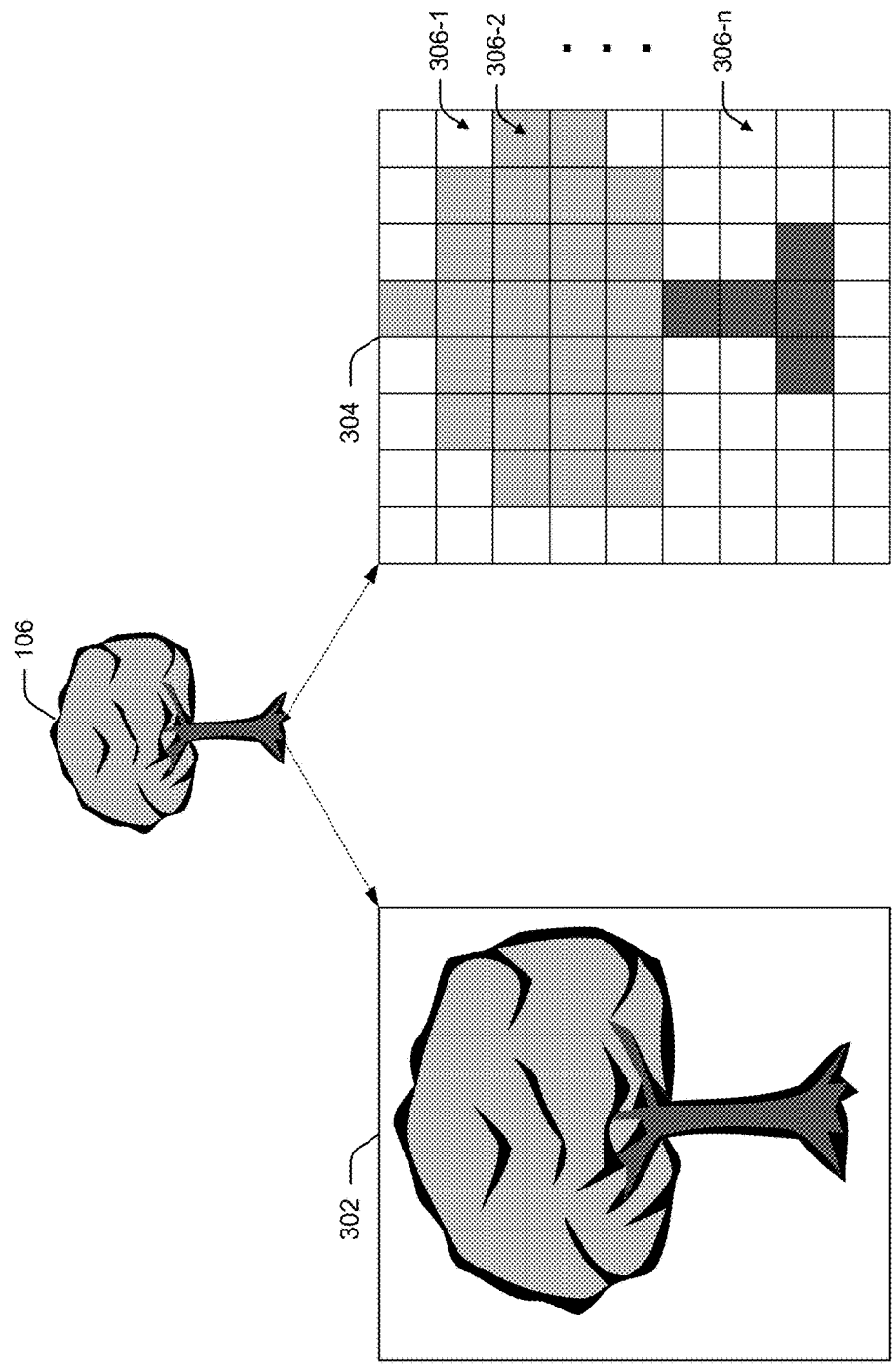
FIG. 3 illustrates differences between an analog image capture and a digital image capture.

Consider FIG. 3 in which alternate image capture mechanisms are employed to capture scene 106 of FIG. 1. Image 302 illustrates an analog capture of scene 106 performed through the use of analog techniques, such as film capture. Here, the image has been captured in a continuous nature. Conversely, image 304 illustrates a digital capture of scene 106. Instead of capturing the image continuously, image 304 represents sectors of scene 106 in discrete components, alternately known as a pixel. Each discrete component has a value associated with it to describe a corresponding portion of the image being captured. For example, discrete component 306-1 represents a region of scene 106 in which the tree is and is not present, discrete component 306-2 represents a region of scene 106 in which a portion of the tree is present, and so forth. Accordingly, image 304 digitally represents scene 106 by partitioning the image into "n" discrete components (where "n" is an arbitrary value), and assigning a value to each component that is uniform across the whole component. Thus, discrete component 306-1 has a first value, discrete component 306-2 has a second value, and so forth all the way up to discrete component 306-$n$. Here, the term "value" is generally used to indicate any representation that can be used to describe an image. In some cases, the value may be a single number that represents an intensity or brightness of a corresponding light wave that is being captured. In other cases, the value may be a combination of numbers or vectors that correspond to various color combinations and/or intensities associated with each color.

The size of a discrete component within a digital image, as well as the number of discrete components, affects a corresponding resolution of the image. For example, image 304 contains 9×8=72 discrete components. However, relative to the analog capture represented in image 302, it can be seen that the digital image capture contains inaccuracies. Given the size of each discrete component, and the uniform nature across the whole of the discrete component, the resultant image lacks details that can be found either in image 302 or original scene 106. By increasing the number of components and reducing the size of the components, the resultant digital image can more accurately capture details and add resolution to the image to more closely resemble the analog version and/or the original captured image. A pixel refers to a singular discrete component of a digital image capture that is the smallest addressable element in the image. Thus, each pixel has a corresponding address and value.

Figure 4:
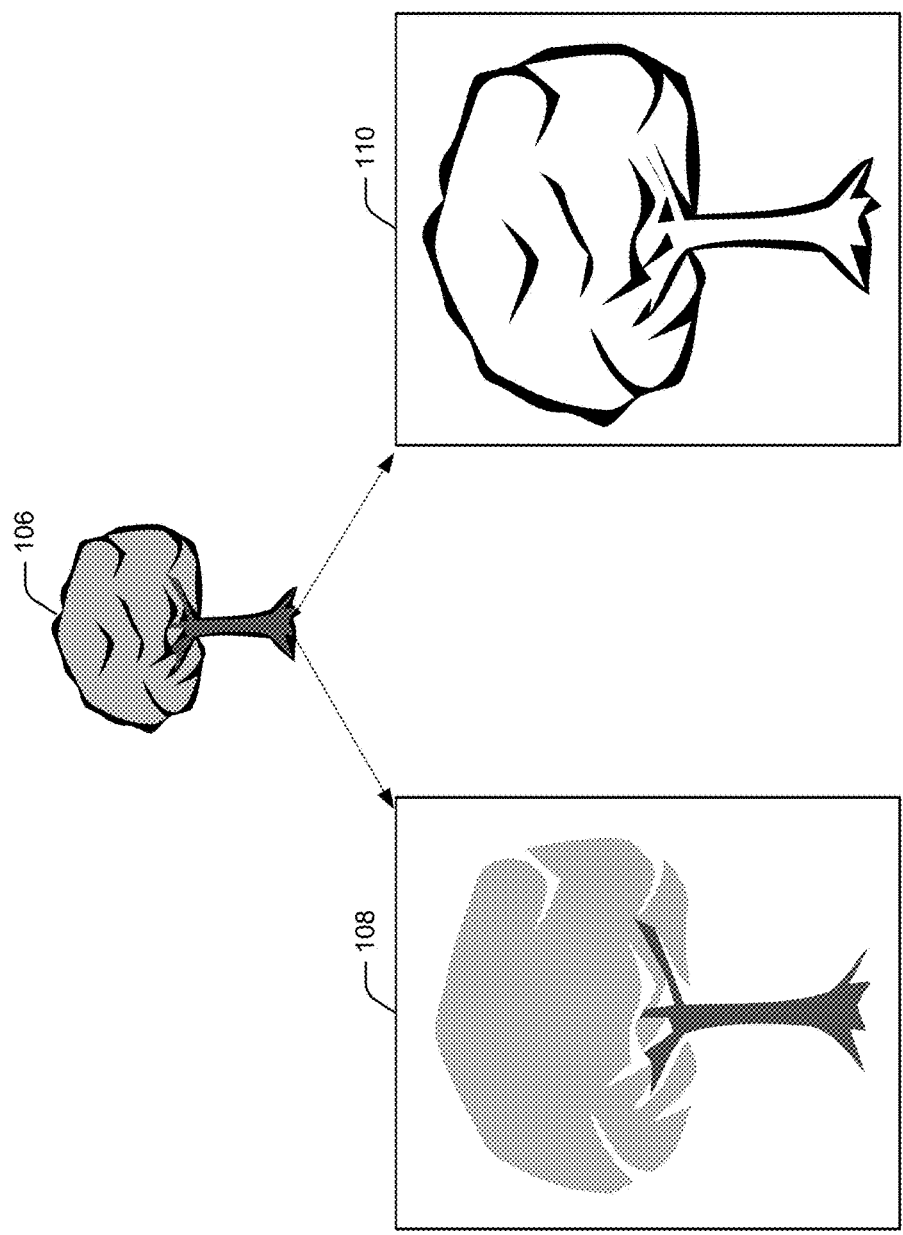
FIG. 4 illustrates examples of digital image captures in accordance with one or more embodiments.

Now consider FIG. 4, which illustrates how digital images can take on different values. To aid in this discussion, FIG. 4 includes scene 106, digital image 108, and digital image 110 of FIG. 1. Recall the above discussion in which a digital image is made up of multiple discrete components. Applying this to digital image 108 and digital image 110, each respective digital image contains multiple discrete components that, when combined, form a digital representation of scene 106. When these images use different representations, such as color representation and a Clear representation, then the discrete components take on different values.

Some digital image capture mechanisms use a process based upon Red-Green-Blue (RGB) color filters to capture color intensity. A singular image sensor, such as one of the image sensors in image sensors 104 of FIG. 1, can consist of several smaller sensors, each of which relates to a particular color (e.g., red, blue, or green). In some cases, each smaller sensor corresponds to a pixel of a resultant digital image. Through careful selection and arrangement, the different smaller (color) sensors can improve the resultant image capture. A Bayer filter is one particular arrangement where 50% of the sensors are associated with green, 25% are associated with red, and 25% are associated with blue. In other words, a general RGB image sensor used to capture an image contains multiple smaller green image sensors, multiple smaller blue image sensors, and multiple smaller red image sensors to make up the overall general RGB image sensor. These smaller sensors capture characteristics about the incoming light with respect to colors, as well as intensity. In turn, the values stored for each discrete representation of an image captured using Bayer filter techniques each express the captured color characteristics. Thus, digital image 108 contains multiple discrete components that each contain a value (or values) that are representative of what is referred to here as a Bayer image capture. While the above discussion refers to RGB, it is to be appreciated that other color combinations can be used without departing from the scope of the claimed subject matter. Two such types of information that are extractable from a Bayer image capture are luma channel data and chroma channel data (alternately referred to here as luma channel information and chroma channel information). Thus, in some embodiments, color spaces that use luma information and chroma information can be used, such as YUV and CIE L*a*b color spaces.

Luma channel information refers to brightness or intensity related to a captured image. For instance, an image or pixel with little to no brightness (e.g., dark or black) would have generally 0% luminance or brightness, while an image or pixel that is has a large amount of light has generally 100% luminance (e.g., bright or white). Depending upon the brightness or intensity, luma information over an image can vary over a range of 0%-100%. Instead of tracking color information, luma information captures light intensity, and can alternately be considered in some manner as a greyscale representation of an image.

Chroma channel information refers to the UV, *a components, and *b components of YUV and L*a*b color spaces. Applying this to digital image 108 when in the form of a Bayer image capture, each discrete component stores a value that represents the various color information as described above. Together, chroma channel information and luma channel information yield a color image that includes shading and color.

Similar to luma channel information, a Clear representation of a digital image refers to an image in which each pixel represents a sensitivity to light and/or shading. Thus, image sensors used to capture a Clear representation of a scene can comprise multiple small sensors are designed to capture light intensity or shading, rather than color. This monochrome aspect improves signal-to-noise ratio in low-light situations and enables a high detail for a given pixel count, though in monochrome (e.g., grayscale). Applying this to digital image 110 when in the form of a Clear image capture, each discrete component of stores a value that represents a monochrome capture.

As discussed above, scene 106 can be represented in different ways using digital formats that capture different information from one another. Each representation contains values and sensors directed towards that particular representation. In the case of a Bayer image capture, the design and usage of the image sensors (and corresponding values) are weighted towards optimally capturing color aspects of a scene. Similarly, in a Clear image representation, the design and usage of the image sensors (and corresponding values) are weighted towards optimally capturing monochrome information about a scene. However, since each form uses discrete representations, rather than analog, there are inaccuracies contained within the corresponding digital image when compared to scene 106. Some embodiments fuse these different representations together as a way to improve a resultant digital image, as further described below. In order to fuse the images together, it is helpful to obtain a relationship between the two images.

Figure 5:
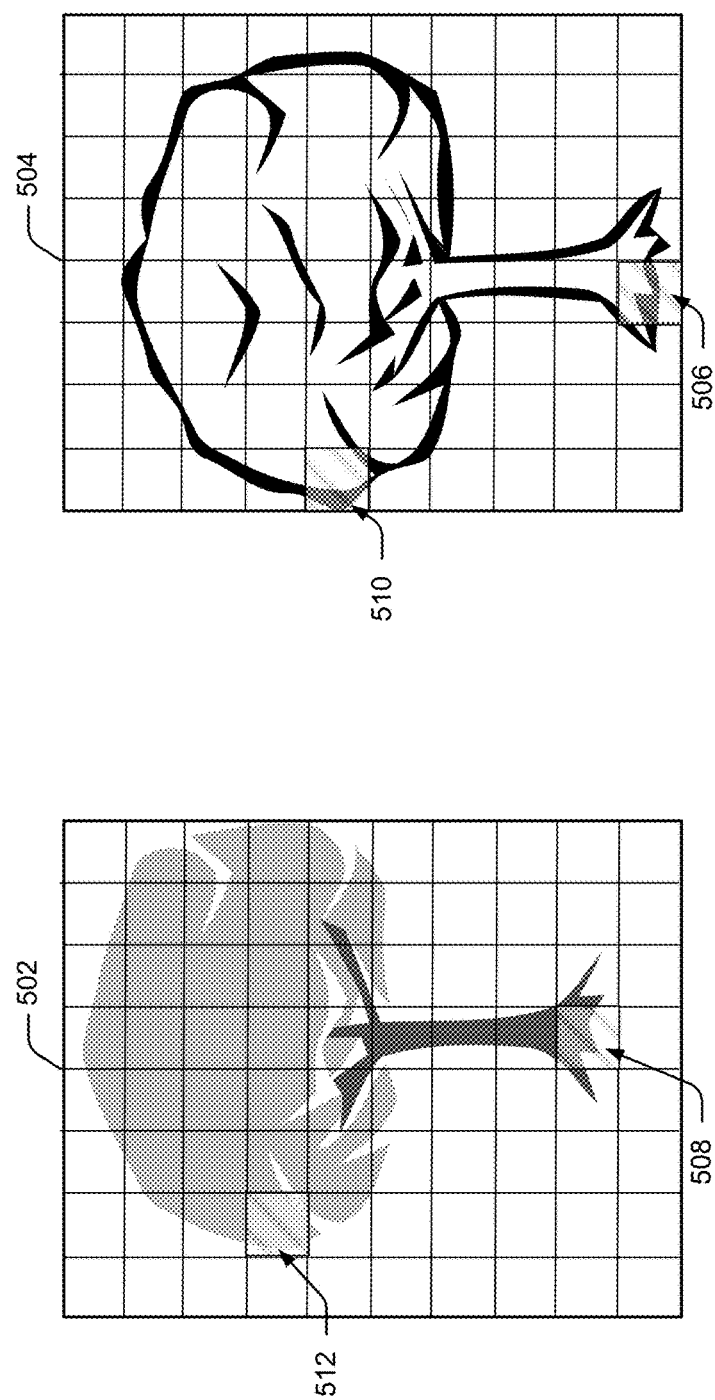
FIG. 5 illustrates an example of image mapping in accordance with one or more embodiments.

FIG. 5 illustrates an example mapping used to align images in accordance with one or more embodiments. The mapping procedure described here illustrates a simple mechanism that aligns multiple images. It is to be appreciated that more complex algorithms or procedures can be used without departing from the scope of the claimed subject matter. FIG. 5 includes image 502 and image 504 that each represent different digital captures of scene 106 of FIG. 1. For discussion purposes, image 502 represents a Bayer image capture and image 504 represents a Clear image capture. However, these images can be any other suitable type of image capture data, such as luma channel information extracted from the Bayer image capture, chroma channel information, and so forth. In this example, the images are time-synchronized (e.g., captured at the same point in time), but not physically aligned. For instance, the tree contained in image 502 has a position slightly above and to the right of center. Conversely, the tree contained in image 504 is slightly below and to the left of center. Various factors can contribute to these different perspectives, such as the physical location of the image sensors. Referring back to image sensors 104 of FIG. 1, note the positioning of the image sensors is horizontal and side-by-side. With this positioning, the image sensors are not physically located in the exact same spot, and therefore inherently capture slightly different perspectives of scene 106. Sensors can be positioned in any suitable manner, such as horizontally side-by-side, vertically centered, long-side adjacent, short side adjacent, and so forth. The distance between sensors can also vary, depending upon various factors associated with the dual camera. In order to align images captured from multiple sensors, some embodiments generate a mapping.

Consider discrete component 506 of image 504. This particular discrete component captures a portion of the tree base. Various embodiments use mapping algorithms to determine that a relationship exists between discrete component 506 and discrete component 508 of image 502, as well as discrete component 510 and discrete component 512, such as various stereo evaluation algorithms (ISGM algorithms, ADCensus algorithms, PM-Forest algorithms, SubPixSearch algorithms, Adaptive GF algorithms, PM-PM algorithms, TSGO algorithms, KADI algorithms, Adapting BP algorithms, and so forth). As one example, some mapping algorithms extract light intensity information from each image, and then find relative similarities between the two as a way to generate a relational mapping. By mapping the two images, various embodiments merge or fuse images together as a way to obtain a more accurate image of the captured scene. Since both images each capture different types of information, some embodiments select (or subtract) portions from each to remove or reduce artifacts generated by the digital representation. It is to be appreciated that any suitable mapping algorithm can be used to determine a relationship between the images, such as color intensity relationship between images, a light intensity between images, etc. Some embodiments generate a depth map, as further described below.

Sometimes it is desirable to align multiple images in order to extract desired information and suppress undesired information. For example, the greyscale information captured using Clear image sensors yields details not captured with Bayer image sensors. Accordingly, fusing these extra details from a Clear image capture with information in a Bayer image capture generates a more accurate, less noisy image when compared to an unprocessed Bayer image capture. Various image fusing algorithms process, extract, suppress, and merge information between images.

Figure 6A:
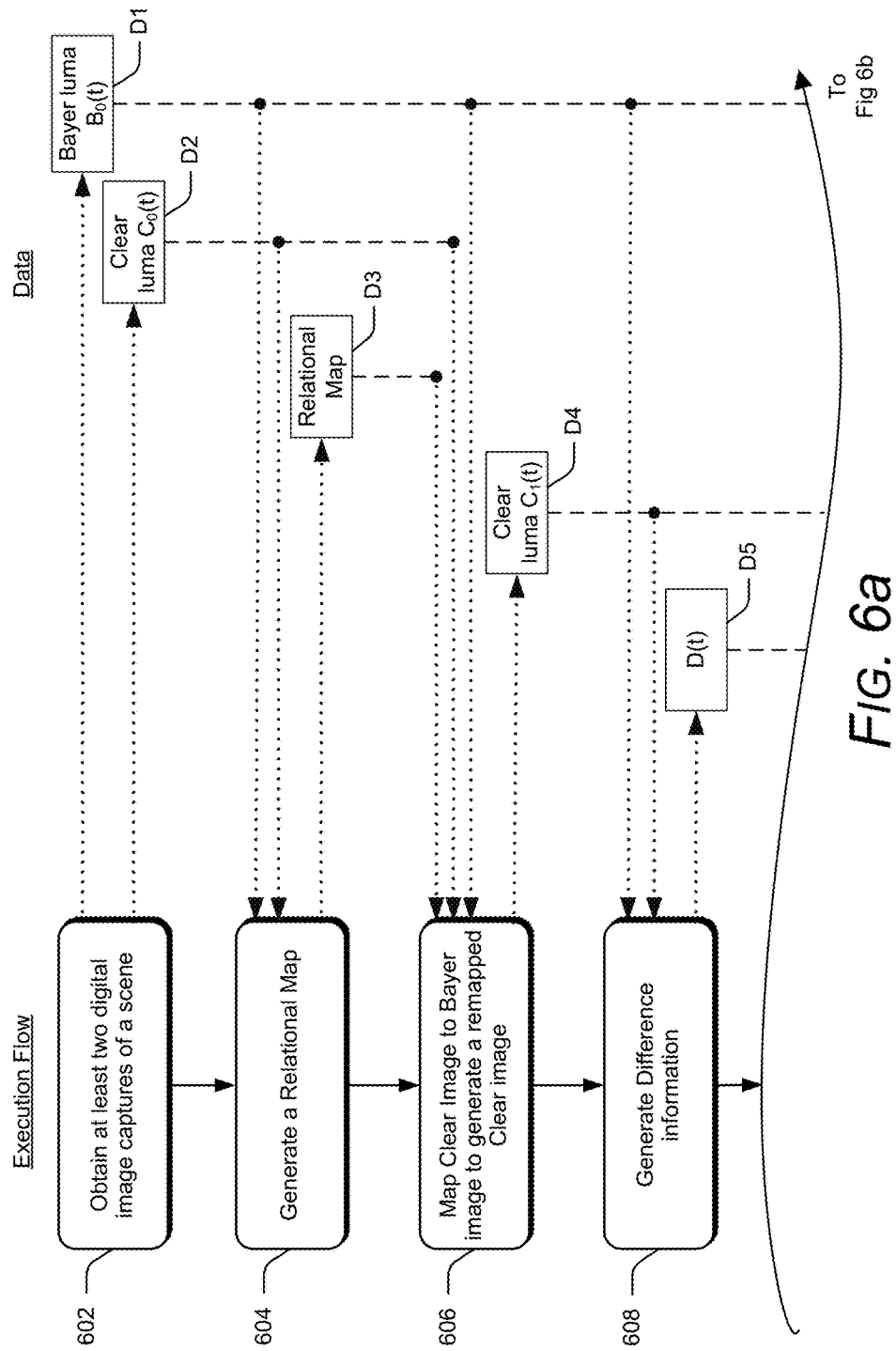
FIGS. 6a-6c illustrate a flow diagram in which image fusion is employed in accordance with one or more embodiments.
Figure 6B:
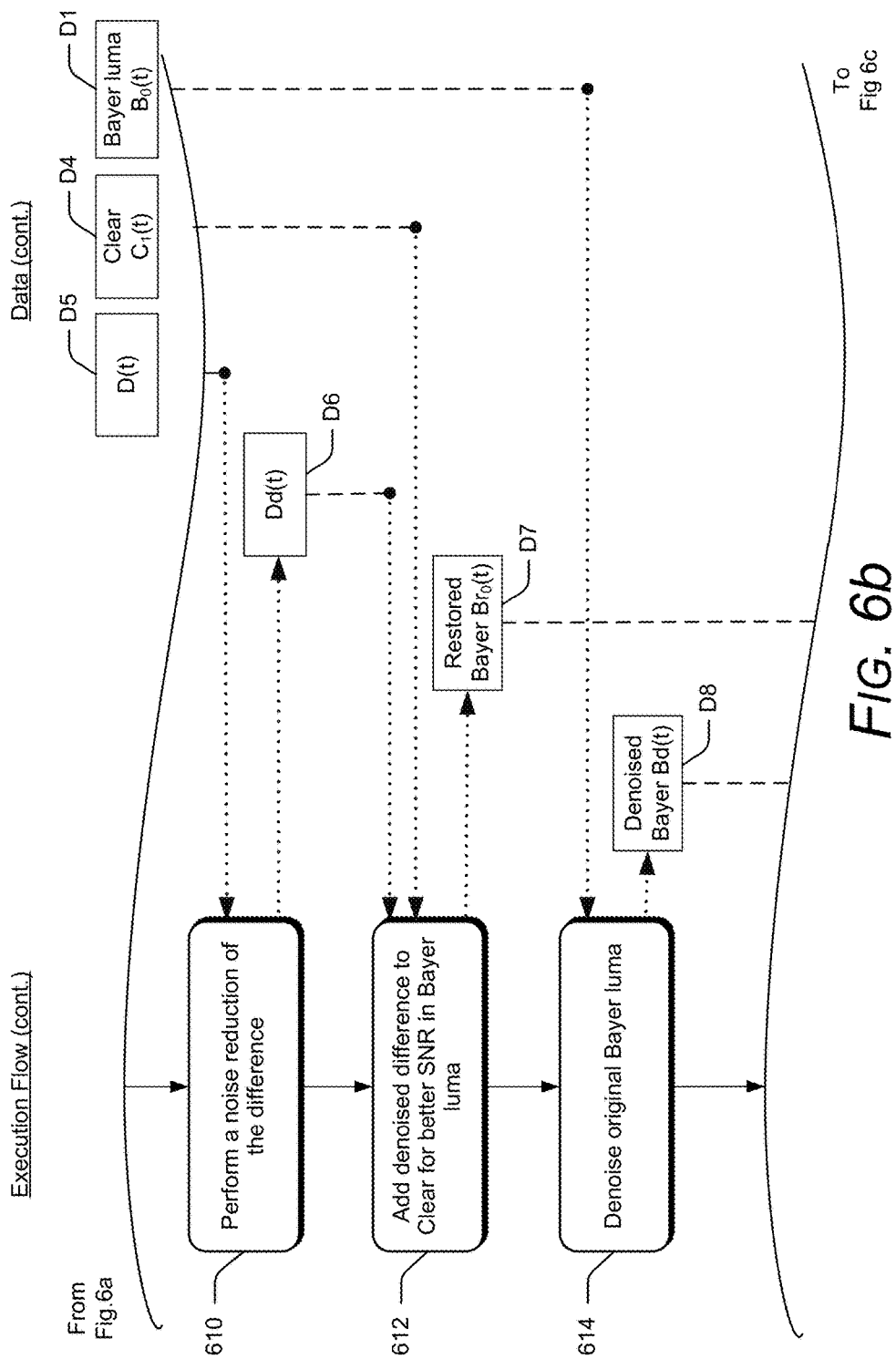
Figure 6C:
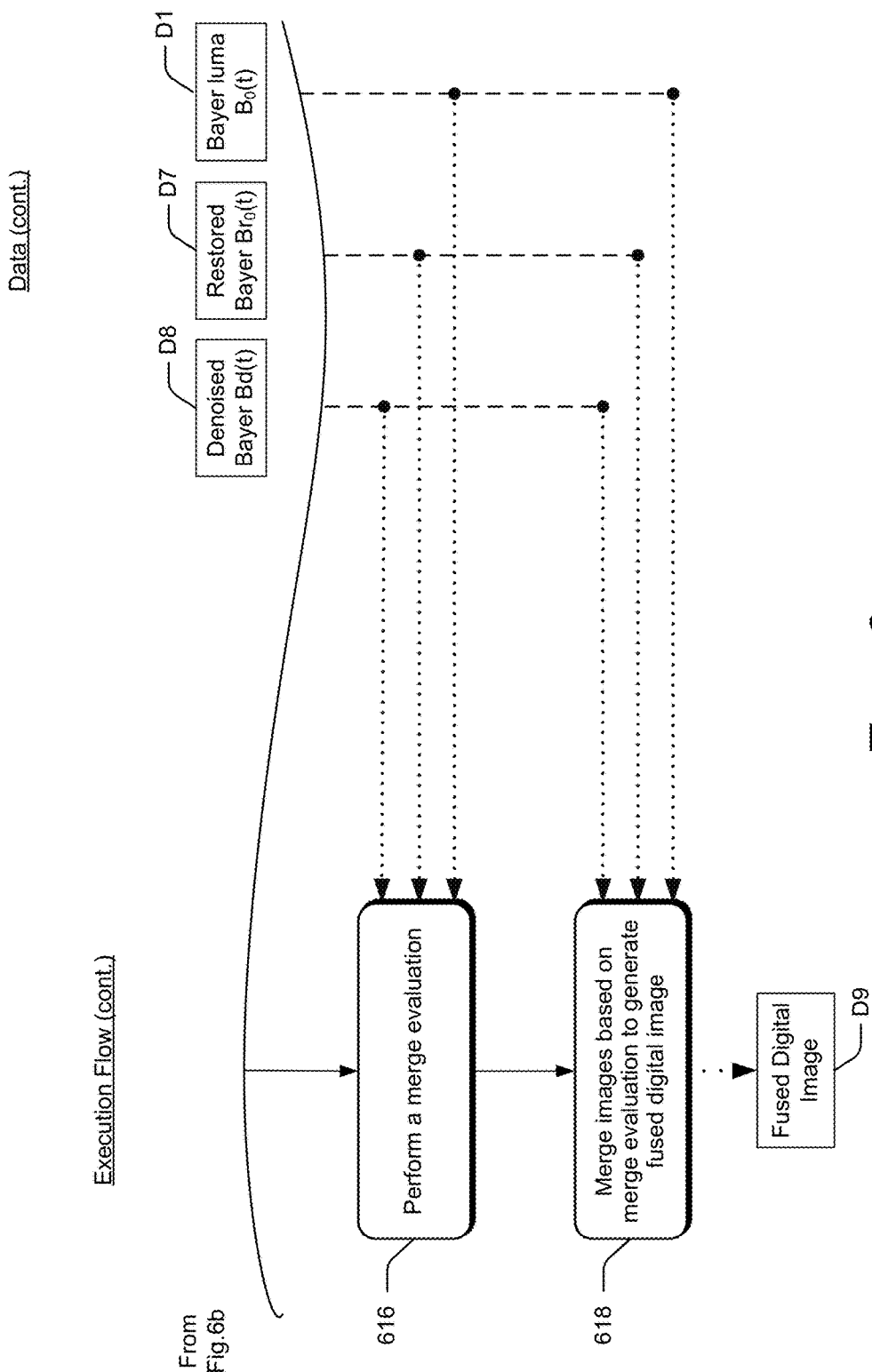

Consider FIGS. 6*a*-6*c* that together illustrate a method of image fusion in accordance with one or more embodiments. The method can be performed by any suitable hardware, software, firmware, or combination thereof. In at least some embodiments, aspects of the method can be implemented by one or more suitably configured software modules, such as image fusion module 112 of FIG. 1. FIG. 6a illustrates a starting point into the method, FIG. 6b illustrates a middle portion of the method, and FIG. 6c illustrates a stopping point out of the method. Each of these Figures has two columns: an execution flow on the left hand side, and data on the right hand side. Each step in the execution flow is marked with a designator that begins with the value "6" and concludes with an arbitrary value "XX" (e.g., "6XX"). The execution steps are linked together using a solid arrow to show a procession of the method. While these steps have a distinct order, it is to be appreciated that other embodiments may alter their order. Each data box on the right hand side is marked with a designator that begins with the letter "D", and concludes with an arbitrary value X (e.g., "DX"). In this flow diagram, each data box on the right-hand side relates to corresponding execution steps on the left hand side. To signify this relationship, a dotted line connects a data box with execution step(s). For example, a horizontal dotted line that originates from an execution step, and ends by pointing into a data box signifies the data of that data box is an output product of that execution step. Conversely, a horizontal dotted line that originates from a data box and ends by pointing into an execution step signifies that the data is an input to, or is used by, the execution step. Thus, a data box will only originate from one execution step, but can feed into multiple execution steps as input. Each data box additionally connects to a vertical dashed line that illustrates a continuation of the data insofar as a dotted line that connects to the vertical line equates to connecting to the data box. It is to be appreciated that data can come in any suitable form or combination. For instance, a data box can simply represent a single data value, or can alternately be an array/vector/matrix of multiple values. In some cases, a data box contains image data, such as image data representative of digital image 108 or digital image 110 of FIG. 1.

Step 602 obtains at least two digital images of a scene. In some cases, each digital image originates from a respective sensor, such as image sensors 104 of FIG. 1. Alternately or additionally, a digital image or channel information can be extracted from an image captured from an image sensor, such as luma channel information. In other cases, each digital image is extracted from a same image. Thus, digital images can be any suitable type of image capture or image information. Here, two digital image captures are generated from step 602: Bayer luma image D1 and Clear luma image D2. These images can be any suitable size, resolution, shape, format, can be rectified with one another, undistorted and rectilinear, distorted and deviated from rectilinear, and so forth. In some cases, some embodiments apply (optional) processing on Clear luma image D2, such as applying a de-noising process to the Clear luma image to generate a de-noised Clear luma image.

Step 604 generates relational map D3 based on Bayer luma image D1 and Clear luma image D2. In some embodiments, the relational map is based upon generating a depth map or disparity map based on stereo calibration. A depth map can be generated for a single luma image, or multiple depth maps can be generated for each luma image. For example, step 604 can generate a first depth map that corresponds to Bayer luma image D1, a second depth map that corresponds to Clear luma image D2, and so forth. Here, the depth map captures data associated with objects contained within the captured scene, such as distance information pertaining to an object contained within the scene relative to a viewpoint or focal point. By generating a depth mapping for each image, the depth maps are then compared for relative similarities. An alternate method captures light intensity in the form of shadows. A depth map can be associated with a single channel (e.g., one representation of information associated with a scene capture) or multichannel (e.g., multiple representations of a scene capture).

Step 606 uses Bayer luma image D1, Clear luma image D2, and relational map D3 to map the Clear luma image to the Bayer luma image. This can be achieved in any suitable manner. For example, some embodiments use light intensity levels contained within each image and captured via the depth map to generate the mapping. However, any other suitable type of mapping algorithm can be used. The mapping process generates and maintains a relational mapping between the Clear luma image and the Bayer luma image, such as a pixel-to-pixel relationship between the images. Step 606 additionally generates a new Clear luma image D4 remapped and realigned to the Bayer luma image.

Consider FIG. 5 where image 502 and image 504 are captured using different sensors with different perspectives. Recall, too, how the point of interest (e.g., the tree) in each image has a different position relative to center. Remapping the clear image to the Bayer image align the two such that the point of interest (and surrounding image capture) has a same relative positioning to center. In the context of image 502 and image 504, a new clear image would result in the point of interest (e.g., the tree) being positioned relative to center at generally a same distance as that in the Bayer image. The term "generally" is used to indicate a distance or positioning which aligns the two images within a predetermined amount of error. Thus, generally a same distance includes real-world deviations from distances that are not exactly the same. For instance, the fixed size of a discrete image component (e.g., a pixel) introduces some error in the digital reconstruction of a scene. Accordingly, image alignment may not be exact. In the case of a mapping process based on light intensity, some error can additionally be introduced due to the real-world nature of image sensors. It can be difficult to obtain or calibrate multiple sensors to exactly detect the same light at an exactly same intensity level. Thus, while each sensor may sense generally the same relative variations in intensity over an image, the exact values and locations may vary from one another. Accordingly, multiple factors can contribute to images being misaligned.

Returning to FIG. 6a, new Clear luma image D4 represents a new version of Clear image D2 realigned to a constant point of Bayer luma image D1. In some cases, the images are realigned using a fixed point, while in other cases, the realignment is performed in small units based upon mapping information. For example, consider a case where an image contains a tree in the background and a bush in the foreground. Since the bush is positioned in the foreground, it has a different depth to the viewer than the tree (e.g., the bush is closer to the viewer than the tree). Accordingly, the portion or region of the image containing the bush may utilize a first alignment process based upon a first mapping that is based upon the perceived depth of the bush, and the portion or region of the image containing the tree may use a second alignment process that is based upon a second mapping that is based upon the perceived depth of the tree. Thus, an image can use or apply different alignment processes for different regions. As in the case of realigning image 502 and image 504, new Clear luma image D4 may generally align with Bayer luma image D1, but include some error due to pixel content variation, light intensity detection differences, and so forth. However, by having this relative mapping, various image processing can be applied, as further described above and below.

Step 608 generates difference information D5. In some embodiments, new Clear luma image D4 is subtracted from Bayer luma image D1 to generate the difference image. This can be simply expressed as:

$$D(t) = B_0(t) - C_1(t) \tag{1}$$

Relating this to FIG. 6a, D(t) equates to difference information D5, $B_0(t)$ equates to Bayer luma image D1, and $C_1(t)$ equates to new Clear luma image D4. As one skilled in the art will appreciate, the above the equation represents a simplified, one dimensional expression, and alternate, more complex two dimensional operations may be used without departing from the scope of the claimed subject matter. In other embodiments, instead of subtracting a Clear luma image from the Bayer luma image to generate difference information D5, a Guided Filter can be used to generate a version of Bayer luma image D1 can be subtracted from $B_0(t)$ instead, where new Clear luma image D4 is used as a guide image. However, as previously discussed, difference information D5 can still include some errors.

Continuing on, the method now advances to FIG. 6b. Step 610 performs a noise reduction on difference information D5 to produce de-noised difference information D6. In some cases, the de-noising process intelligently de-noises difference information D5 by applying more de-noising or more aggressively de-noising parts where the differences captured in difference information D5 are larger relative to others. These larger differences are frequently representative of errors, such as those described above due to mapping misalignments from light intensity detection errors, pixel resolution errors, and so forth. In some cases, the noise reduction process on difference information D5 can include adaptive de-noising, in which statistics are maintained and/or utilized to identify noise errors caused by intensity detection differences. Thus, de-noised difference information D6 generates a filtered version of noise contained mostly within the Bayer luma image, since the Clear luma image that has been subtracted out has a much lower noise level. As further described herein, the Clear luma image can be (optionally) de-noised prior to subtraction.

Upon generating de-noised difference information D6, step 612 adds de-noised difference information D6 together with new Clear luma image D4 to obtain Restored Bayer luma image D7. Here, Restored Bayer luma image D7 is a restored de-noised Bayer luma image, resulting in an improved SNR relative to Bayer luma image D1. Recall from above, by filtering or de-noising difference information D5, the corresponding noise in Bayer luma image D1 is suppressed as well. New Clear luma image D4 is added back in to restore the details captured by the Clear luma image. As in the case above, this can be simply expressed by the one dimensional equation:

$$Br_0(t) = Dd(t) + C_1(t) \tag{2}$$

where $Br_0(t)$ equates to Restored Bayer luma image D7 of FIG. 7b, Dd(t) equates to de-noised difference information D6 of FIG. 7b, and $C_1(t)$ equates to new Clear luma image D4 of FIG. 6a. As in the case of equation (1) above, equation (2) has been simplified for discussion purposes, and alternate, more complex operations may be used without departing from the scope of the claimed subject matter. While Restored Bayer luma image D7 has an improved SNR relative to Bayer luma image D1, this process can introduce artifacts or alternate errors. For example, consider a case where relational map D3 includes errors. These errors manifest into large differences when comparing Restored Bayer luma image D7 to Bayer luma image D1 and/or a de-noised version of the Bayer luma image. The de-noising process applied in step 610 can amplify these differences, causing more distortion or artifacts. Some embodiments evaluate these differences in various manners as part of a post-processing procedure to suppress artifacts introduced in the above described procedure.

Step 614 de-noises Bayer luma image D1 to generate a de-noised version of the original Bayer luma channel, designated here as De-noised Bayer luma image D8. In some embodiments, the de-noised original luma image is used to help identify unwanted artifacts, as further described below.

Continuing on, the method now advances to FIG. 6c. Step 616 performs a merge evaluation to identify artifacts introduced from the previous processing. Ideally, the difference between Bayer luma image D1 and Restored Bayer image D7 simply encompasses noise that is described in terms of an error threshold, such as the noise standard deviation E. However, in the case of artifacts, errors corresponding to the artifacts spike above the noise standard deviation. Mathematically, this can be expressed as:

$$|Br_0(t) - B_0(t)h| > \epsilon \tag{3}$$

where $Br_0(t)$ equates to Restored Bayer luma image D7 of FIG. 7b, B0(t) equates to Bayer luma image D1 of FIG. 6a, and E is the noise standard deviation. This evaluation can alternately be used with De-noised Bayer luma image D8 in place of Bayer luma image D1.

When comparing De-noised Bayer luma image D8 with Restored Bayer luma image D7, step 614 can alternately or additionally evaluate weights for these images and merge them together in a weighted sum. The weighted sum identifies where to emphasize image merging using Restored Bayer luma image D7 information versus De-noised Bayer luma image D8. For example, when the difference between the two images is low, some embodiments use more information from Restored Bayer luma image D7 for that portion of the fused digital image. When the difference between the two images is high, more information from De-noised Bayer luma image D8 is fed into the corresponding portion of the fused image. Accordingly, the fused digital image may use varying portions of the two input images, where the two input images are fused together with unequal portions (e.g., one image contributes more information than the other). Here, the merge evaluation can have any combination of inputs related to the images under evaluation. For instance, this example illustrates Bayer luma image D1, Restored Bayer luma image D7, and De-noised Bayer luma image D8 as feeding into a merge evaluation. Some embodiments use all of these images, while others use varying combinations.

Step 618 merges images together based upon the merge evaluation to generate a fused digital image D9. As further described above, some embodiments use an epsilon filter approach to merge the images based upon weighting the differences between images. Alternately or additionally, a blending mask, M(t), can be used to blend the images and smooth out these artifacts. This can be expressed mathematically as:

$$BF(t) = M(t) * Bd(t) + (1 - M(t)) * Br_0(t) \tag{4}$$

Where BF(t) represents the merged image, M(t) equates to the blending mask, Bd(t) equates to De-noised Bayer luma imaged D8 of FIG. 6b, and Br0(t) equates to restored Bayer luma image D7 of FIG. 6b. A blending mask can be constructed using any suitable type of window function, such as a triangular window, a rectangular, a bell-shaped curve, and so forth. In some cases, the blending mask can use multiple windows applied around areas where image differences are large, such as a set of merged triangular windows.

Capturing different images using separate image sensors and selectively fusing these separate images together results in an image with improved quality/lower SNR than images captured via a single image sensor. It also allows for a fast de-noising processes such as wavelet shrinkage, bilateral de-noising, and so forth. This fast de-noising process contributes not only to the improved quality/lower SNR, but to a positive user perception of devices that incorporate these methods. Thus, image fusion of dual cameras provides an improved image capture mechanism for small devices.

Having considered a discussion of a Bayer-Clear image fusion, consider now a discussion of an example device that can be utilized to implement the embodiments described above.

Example Device

Figure 7:
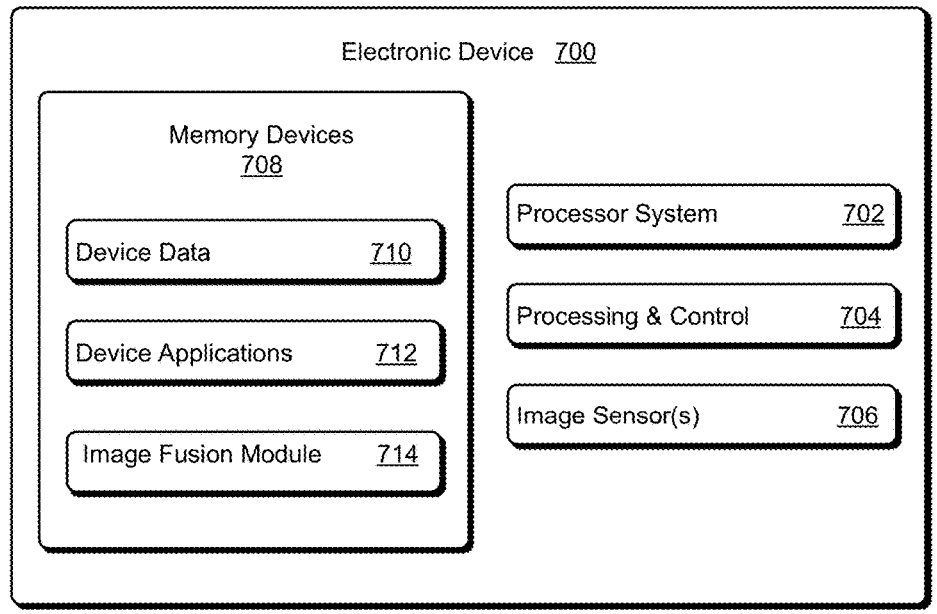
FIG. 7 is an illustration of a device that can use the present techniques.

FIG. 7 illustrates various components of an example electronic device 700 that can be utilized to implement the embodiments described herein. Electronic device 700 can be, or include, many different types of devices capable of implementing image fusion from multiple image sensors, such as image fusion module 112 of FIG. 1.

Electronic device 700 includes processor system 702 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternately or in addition, the electronic device can be implemented with any one or combination of software, hardware, firmware, or fixed-logic circuitry that is implemented in connection with processing and control circuits, which are generally identified as processing and control 704. Although not shown, electronic device 700 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 700 includes image sensor(s) 706, which represent functionality that digitally captures scenes. In some embodiments, each image sensor includes in electronic device 700 captures information about a scene that is different from the other image sensors, as further described above. For example, a first image sensor can capture a color image using Bayer techniques, and a second image sensor can capture clear images. The sensors can be individual sensors that generate an image capture, or contain multiple smaller sensors that work in concert to generate an image capture.

Electronic device 700 also includes one or more memory devices 708 that enable data storage, examples of which include random access memory (RAM), non-volatile memory (e.g., read-only memory (ROM), flash memory, EPROM, EEPROM, etc.), and a disk storage device. Memory devices 708 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 708 provide data storage mechanisms to store the device data 710 and other types of information or data. In some embodiments, device data 710 includes digital images, such as images captured via image sensors 706. Memory devices 708 also provide storage for various device applications 712 that can be maintained as software instructions within memory devices 708 and executed by processor system 702.

Memory devices 708 also includes image fusion module 714, which generally represents functionality that generates a digital image by fusing together information from different captured information. In some embodiments, image fusion module 714 receives digital images from image sensors 706 as inputs, and uses information from each to generate an improved image, as further described above. While implemented here as residing on memory devices 708, alternate embodiments implement image fusion module 714 using varying combination of firmware, software, hardware, and so forth.

It is to be appreciated that while electronic device 700 includes distinct components, this is merely for illustrative purposes, and is not intended to be limiting. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A device comprising:
   a first image sensor for capturing digital images;
   a second image sensor synchronized with the first image sensor for capturing digital images; and
   at least one processor configured to generate a fused digital image by performing operations comprising:
      obtaining a Bayer luma image from a first digital image captured via the first image sensor;
      obtaining a Clear luma image from a second digital image captured via the second image sensor;
      generating a relational mapping based, at least in part, on a relationship between the Bayer luma image and the Clear luma image;
      generating difference information between Bayer luma image and the Clear luma image based, at least in part, on the relational mapping;
      de-noising the difference information to generate de-noised difference information;
      adding the de-noised difference information to the Clear luma image effective to generate a restored de-noised Bayer luma image;
      performing a merge evaluation using the restored de-noised Bayer luma image and a third luma image that is based, at least in part, on the Bayer luma image; and
      generating the fused digital image by merging the restored de-noised Bayer luma image with the third luma image using the merge evaluation.

2. The device of claim 1, wherein the relational mapping is based, at least in part, on mapping light intensity between the Bayer luma image and the Clear luma image.

3. The device of claim 1, wherein generating the difference information comprises subtracting the Clear luma image from the Bayer luma image using the relational mapping.

4. The device of claim 1, wherein performing the merge evaluation comprises generating a weighted sum that identifies when to merge more information from the restored de-noised Bayer luma image than the third luma image.

5. The device of claim 1, wherein the at least one processor is further configured generate the fused digital image by performing operations comprising:
   de-noising the Clear luma image; and
   generating the relational mapping using the de-noised Clear luma image.

6. The device of claim 1, wherein generating the fused digital image further comprises:
   applying a blending mask as part of merging the restored de-noised Bayer luma image with the third luma image.

7. The device of claim 6, wherein the blending mask comprises a set of merged triangular windows.

8. The device of claim 1, wherein the third luma image comprises the Bayer luma image obtained from the first digital image.

9. A method comprising:
   obtaining a Bayer luma image from a first digital image captured via a first image sensor;
   obtaining a Clear luma image from a second digital image captured via a second image sensor that is synchronized with the first image sensor;
   generating a relational mapping based, at least in part, on the Bayer luma image and the Clear luma image by using a depth map;
   generating difference information by subtracting the Clear luma image from the Bayer luma image using the relational mapping to align the Clear luma image and the Bayer luma image;
   de-noising the difference information to generate de-noised difference information;
   adding the de-noised difference information to the Clear luma image effective to generate a restored de-noised Bayer luma image;
   performing a merge evaluation using the restored de-noised Bayer luma image and a third luma image that is based, at least in part, on the Bayer luma image; and
   generating a fused digital image by merging the restored de-noised Bayer luma image with the third luma image using the merge evaluation.

10. The method of claim 9, wherein obtaining the Bayer luma image further comprises:
    extracting Bayer luma channel data from the first digital image.

11. The method of claim 9, further comprising:
    generating the third luma image by de-noising the Bayer luma image obtained from the first digital image.

12. The method of claim 9, further comprising:
    applying a blending mask as part of merging the restored de-noised Bayer luma image with the third luma image, the blending mask comprising multiple windows.

13. The method of claim 9, wherein de-noising the difference information further comprises de-noising the difference information based, at least in part, on wavelet shrinkage.

14. A device comprising:
    a first image sensor for capturing digital images;
    a second image sensor synchronized with the first image sensor for capturing digital images; and
    an image fusion module implemented at least partially in hardware, and configured to:
      generate a relational mapping based, at least in part, on a Bayer luma image extracted from a first digital image and a Clear luma image extracted from a second digital image with a capture synchronized to the first digital image
      generate difference information between the Bayer luma image and the Clear luma image based, at least in part, on the relational mapping;
      generate a restored de-noised Bayer luma image based, at least in part, on the difference information;
      perform a merge evaluation using the restored de-noised Bayer luma image and a third luma image that is based, at least in part, on the Bayer luma image; and
      generate a fused digital image by merging the de-noised Bayer luma image with the third luma image using the merge evaluation.

15. The device of claim 14, wherein the image fusion module is further configured to generate difference information using a Guided filter based, at least in part, on the Clear luma image.

16. The device of claim 14, wherein the image fusion module is further configured to generate weighted sum that identifies when to merge more information from the restored de-noised Bayer luma image than the third luma image.

17. The device of claim 14, wherein the image fusion module is further configured to:
    de-noise the Clear luma image; and
    generate the relational mapping using the de-noised Clear luma image.

18. The device of claim 14, wherein the image fusion module is further configured to:
    extract the Bayer luma image from the first digital image, the first digital image captured in Luminance-Blue-Luminance-Red-Luminance (YUV) color space format.

19. The device of claim 14, wherein the image fusion module is further configured to:
    generate the fused image using unequal portions of the de-noised Bayer luma image and the third luma image.

20. The device of claim 14, wherein the image fusion module is further configured to:
    identify one or more artifacts in the de-noised Bayer luma image based, at least in part, on an error threshold.

* * * * *